United States Patent [19]

Chan

[11] 4,157,479
[45] Jun. 5, 1979

[54] THEFT PREVENTION STARTER SYSTEM FOR A VEHICLE

[76] Inventor: Stanley S. C. Chan, 1809 McIntyre, Ann Arbor, Mich. 48105

[21] Appl. No.: 844,707

[22] Filed: Oct. 25, 1977

[51] Int. Cl.² .................. B62D 63/04; H02J 1/00; H01H 27/06
[52] U.S. Cl. .................. 307/10 AT; 361/172; 200/42 R; 200/44
[58] Field of Search ............ 307/10 AT; 200/42 R; 340/64; 361/172; 123/179 BG; 70/237

[56] References Cited

U.S. PATENT DOCUMENTS

| | | | |
|---|---|---|---|
| 2,921,152 | 1/1960 | Simjian | 200/42 R |
| 3,136,307 | 6/1964 | Richard | 361/172 |
| 3,283,550 | 11/1966 | Bradway | 361/172 |
| 3,660,624 | 5/1972 | Bell | 307/10 AT |

Primary Examiner—L. T. Hix
Assistant Examiner—S. D. Schreyer
Attorney, Agent, or Firm—Olsen and Stephenson

[57] ABSTRACT

A theft prevention starter system for a motorized vehicle is disclosed which operates to thwart unauthorized attempts at starting the vehicle's engine. The system includes a starter circuit having a starter switch, a bridge circuit, and an anti-theft switch disposed in series with each other. A key is provided having a pair of resistors mounted thereon that are connected to other resistors when the key is inserted into the vehicle's starter lockswitch to form the bridge circuit. A sensing branch of the bridge circuit is coupled to the anti-theft switch and in the event current flows through the sensing branch, the anti-theft switch will be opened to prevent the activation of the starter motor. Current flow in the sensing branch circuit will be absent if resistors having the proper value of resistance are matched when the key is inserted in the lockswitch. Inserting a key having the improper resistances will result in the flow of current in the sensing branch portion of the bridge circuit which will provide for the immediate opening of the anti-theft switch thereby precluding activation of the starter motor.

3 Claims, 3 Drawing Figures

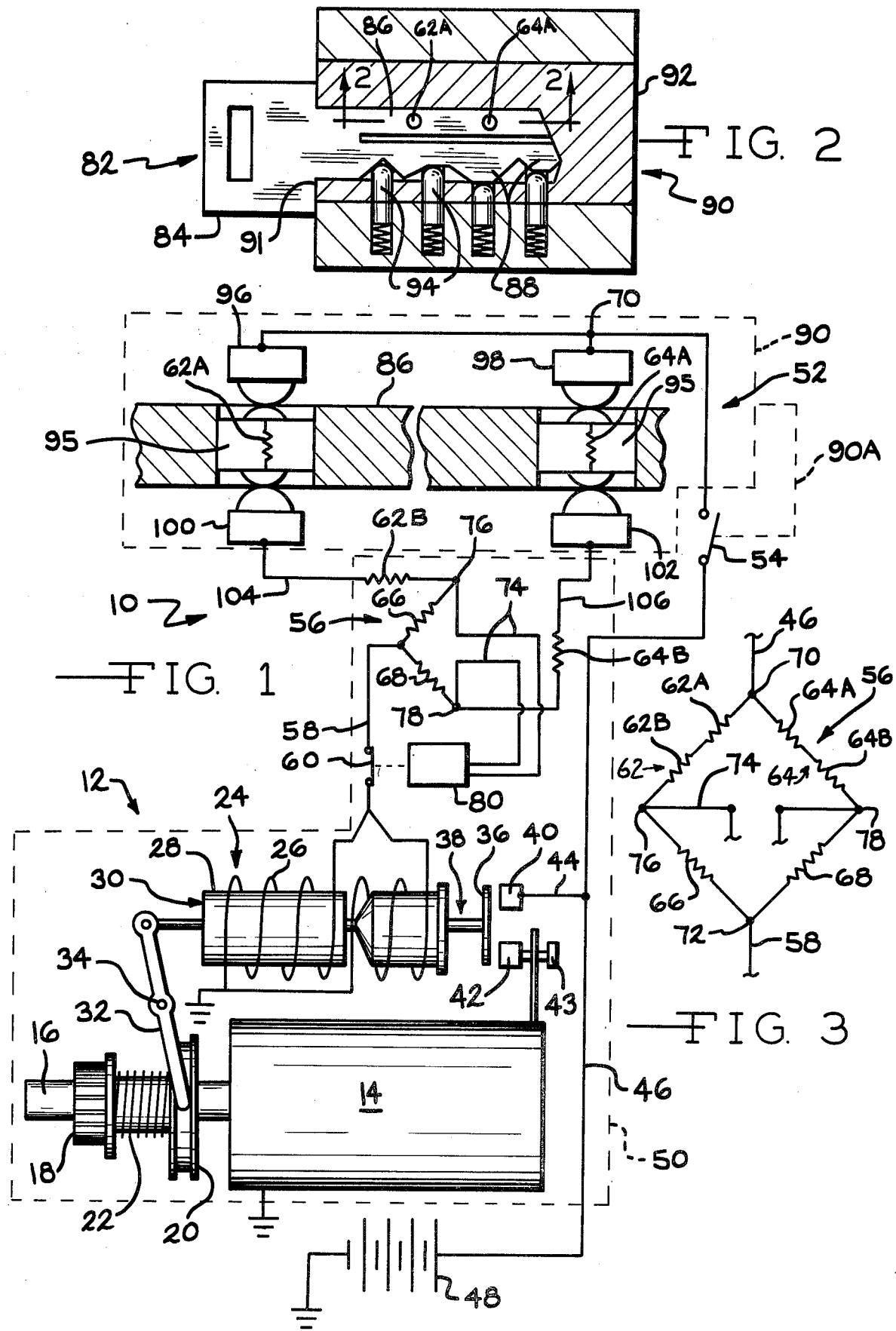

THEFT PREVENTION STARTER SYSTEM FOR A VEHICLE

BACKGROUND OF THE INVENTION

The present invention relates generally to anti-theft systems for vehicles, and more particularly, relates to a theft prevention starter system that operates to preclude the operation of a vehicle's starter motor until the proper key has been inserted into the starter switch.

Theft prevention systems have been developed to reduce the likelihood that an owner's vehicle will be stolen. Many of these systems are electrical in nature which when activated operate to interrupt the flow of current in the ignition system thereby preventing ignition in the vehicle's engine. One such system is illustrated in Pat. No. 3,660,624, which shows an ignition key that is provided with a coded electrical arrangement which corresponds with a coded key adapter that is mounted outside of the conventional ignition lockswitch. This system functions to interrupt the transmission of electrical current to the spark plugs so as to prevent the firing of the engine unless the proper electrical code on the key is mated with the electrical code on the adapter. Although systems such as the one disclosed in Pat. No. 3,660,624 are adequate, an experienced thief can readily see that the vehicle is equipped with anti-theft system and can then immediately proceed to take steps to circumvent the theft prevention system. Moreover, relatively complex and sophisticated electrical systems are needed to properly integrate the ignition system with the theft prevention system to provide an effective and reliable anti-theft system. These systems can be costly from the standpoint of construction and installation.

There is a need, therefore, for a low-cost anti-theft system which is unnoticable, and which effectively prevents the starting of the vehicle's engine.

It is an object of the present invention to provide a theft prevention starter system which serves to prevent the unauthorized starting of a vehicle.

SUMMARY OF THE INVENTION

In accordance with the present invention, a theft prevention starter system is provided for a vehicle such as an automobile, for example, having an engine, a battery, and a starter system including a conventional starter motor. The present invention provides a theft prevention starter system which includes a starter circuit having a normally closed anti-theft switch that is disposed in series with a starter switch that is opened and closed by a starter lockswitch. The starter circuit further includes a bridge circuit having the normal array of resistors and is connected in series with the starter switch and the anti-theft switch. A key cooperates with the lockswitch to provide for the opening and closing of the starter switch.

The bridge circuit which forms auxiliary circuit means in the starter circuit consists of a pair of coded circuit portions. One coded circuit portion comprises a pair of resistors that are mounted on the stem portion of the key. The other coded portion of the bridge circuit comprises the remaining resistors which are located at a position remote from the starter lockswitch. The bridge circuit includes a sensing branch that is coupled to the anti-theft switch. If current should flow through the sensing branch, the anti-theft switch will be opened thereby precluding the activation of the starter motor.

When the proper key having the appropriate resistances mounted thereon is inserted in the lockswitch, suitable leads connect the resistors on the key to the remaining resistors to form the bridge circuit. If the resistors are properly matched, no current will flow in the sensing branch portion when the key is rotated to the start position thereby maintaining the anti-theft switch in a closed condition, allowing the closing of the starter motor circuit to provide for the activation of the starter motor.

If a key is inserted in the lockswitch and does not have the appropriate resistors mounted thereon, current will flow in the sensing branch thereby immediately causing the anti-theft switch to be opened. If a key is inserted into the lockswitch and does not make electrical contact with the leads that are connected to the other resistors, the starter motor cannot be activated since the starter circuit is not closed between the battery and the starter motor.

Further objects, features and advantages of the present invention will become apparent from a consideration of the following description when taken in connection with the appended claims and the accompanying drawing in which:

FIG. 1 is a schematic diagram showing the present invention integrated with the starter system of a motor vehicle and showing a fragmentary sectional view of the key of the present invention taken substantially from line 2—2 in FIG. 2;

FIG. 2 is an elevational sectional view of a starter lockswitch showing the key of the present invention fully inserted therein; and FIG. 3 is a schematic diagram of a bridge circuit that is incorporated in the theft prevention starter system of the present invention.

DETAILED DESCRIPTION OF THE INVENTION

Referring to the drawing, the theft prevention starter system of the present invention, indicated generally at 10 in FIG. 1 operates to enable the starting of the vehicle's engine only when the proper key is used. In particular, the theft prevention starter system 10 serves to interrupt the flow of current to the starter solenoid of the vehicle's starter system in the event that an improper key has been used in an attempt to start the engine.

The starter system, indicated generally at 12 in FIG. 1, includes a starter motor 14 having a drive shaft 16 which carries a ring gear 18 that is connected to a sleeve 20 by a spring 22. The ring gear 18, the sleeve 20 and the spring 22 are longitudinally movable on the drive shaft 16 between a retracted position illustrated in FIG. 1 and an extended position leftward of the retracted position. In the extended position, the ring gear 18 is in engagement with the engine's flywheel (not shown). When the ring gear 18 is in engagement with the flywheel and the starter motor is activated, the engine will be cranked to provide for its starting.

A starter solenoid 24 operates to move the ring gear 18 on the drive shaft 16 and to connect and disconnect the starter motor 14 with the vehicle's battery. The starter solenoid 24 includes a coil 26 and a movable actuator 28. One end 30 of the actuator 28 is pivotally connected to an arm member 32 that is pivotally fulcrummed at 34. The arm 32 is engaged with the sleeve 20 to provide for reciprocal longitudinal movement of the ring gear 18 on the drive shaft 16 in response to longitudinal movement of the actuator 28. A contact member 36 is mounted on the other end 38 of the actuator 28 and is movable between an open position illustrated in FIG. 1 and a closed position in which it engages contacts 40 and 42. Contact 40 is connected through lines 44 and 46 to the vehicle's battery 48. Contact 42 is connected to the positive lead 43 of the starter motor 14. The contact member 36 and the contacts 40 and 42 thereby function as a switch for connecting and disconnecting the starter motor 14 to the battery 48.

When the solenoid 24 is energized, the actuator 28 is moved to the right as viewed in FIG. 1. The solenoid 24 is so arranged with the ring gear 18 and the contact member 36 so that the ring gear 18 first engages the teeth of the flywheel before the contact member 36 is moved to close the contacts 40 and 42. After the ring gear 18 has engaged the teeth of the flywheel, further movement of the actuator 28 to the right provides for the engagement of the contact member 36 with the contacts 40 and 42 thereby energizing the starter motor 14 to crank the engine. When the solenoid 24 is energized, the actuator 28 moves in a single stroke to the right until the contact member 36 engages the contacts 40 and 42.

When the solenoid 24 is deenergized, the actuator 28 returns to the position shown in FIG. 1 and during this movement, the contact member 36 first breaks engagement with the contacts 40 and 42 thereby turning off the starter motor 14. Further movement of the actuator 28 to the left pulls the ring gear 18 to its retracted position in FIG. 1 out of engagement with the flywheel.

The starter solenoid 24 and the starter motor 14 are normally located within a housing represented by the broken lines at 50. In motor vehicles such as automobiles, the starter housing is normally located at the underside of the vehicle near the location of the flywheel.

The theft prevention starter system 10 includes a starter circuit 52 that serves to connect the battery 48 with the coil 26 of the starter solenoid 24. The starter circuit 52 includes the line 46, a starter switch 54 that is located in the line 46, a bridge circuit 56 having an input connected line 46 and an output connected through a line 58 to the coil 26 of the starter solenoid 24. An antitheft switch 60 is disposed in the line 58 in series with the bridge circuit 56 and the starter switch 54. The anti-theft switch 60 is illustrated in a normally closed position and is coupled to a portion of the bridge circuit 56 and is opened whenever current flows through the portion of the bridge circuit 56 to which it is coupled.

The bridge circuit 56 (FIGS. 1 and 3) comprises the usual four arms, one arm 62 having resistors 62A and 62B, another arm 64 having resistors 64A and 64B and the remaining two arms having resistors 66 and 68, respectively. Line 46 is connected at the junction point 70 and serves as the input to the bridge circuit 56. Line 58 is connected to the junction point 72 of the bridge circuit 56 and serves as its output. A line 74 is connected between the junction points 76 and 78 and serves as a sensing branch for the theft prevention starter system 10.

The anti-theft switch 60 is opened by suitable electrical or electronic actuating means 80 which is coupled to the branch 74 and which is responsive to the flow of current therethrough to provide for the opening of the anti-theft switch 60. Regardless of the means so employed, it is important only that the starter circuit 52 be opened when current flows through the sensing branch 74. Thus, the actuating means 80 can take the form of a solenoid having its coil connected with the branch 74 and its actuator connected to the contact arm of the anti-theft switch 60 to thereby provide for the opening of the switch 60 whenever current flows through the sensing branch 74. The important aspect of the sensing branch 74 and its connection to the actuating means 80 is that it serves to indicate by means of current flow that a theft attempt is being made.

It can be shown theoretically that current will not flow through the sensing branch 74 of the bridge circuit 56 when the product of the value of the sum of the resistances in the arm 62 times the value of the resistor 68 equals the product of the value of the sum of the resistances in the arm 64 times the value of the resistor 66. This principle forms the keystone on which the sensing branch 74 is used for detecting theft attempts.

The key 82 (FIGS. 1 and 2) includes a handle portion 84 and a stem portion 86 having the usual bitting steps 88. A pair of resistors 62A and 64A are mounted on the stem portion 86. The key 82 cooperates with a lockswitch 90 to open and close the starter switch 54 in response to selective rotation of the key 82. The operative association between the lockswitch 90 and the switch 54 is represented by the broken line 90A. The lockswitch 90 includes the standard cylinder 92 having key receiving means in the form of a keyhole 91 and tumblers 94 which are engaged by the bitting steps 88 of the key 82. Rotation of the key 82 to a first position energizes the ignition system of the vehicle (not shown) and further rotation of the key 82 provides for the closing of the starter switch 54. The key 82 and the lockswitch 90 therefore function as lock means for the ignition/starter systems.

The resistors 62A and 64A are mounted on the stem portion 86 (FIG. 1) of the key 82 in spaced relation with each other and are insulated from the key 82 by means of the insulators 95. Contacts 96 and 98 are suitably located within the lockswitch 90, shown in broken lines in FIG. 1, and are connected to the lead 46 at the junction 70. Similarly, contacts 100 and 102 are also suitably located within the lockswitch 90 and are connected by the lines 104 and 106 to the junction points 76 and 78 of the bridge circuit 56. With the key 82 inserted in the keyhole 91 of the lockswitch 90, the resistor 62A is in electrical engagement with the contacts 96 and 100 and the resistor 64A is in electrical engagement with the contacts 98 and 102.

The resistor 62B is disposed in the line 104 between the resistor 62A and the junction 76 and the resistor 64B is disposed in the line 106 between the resistor 64A and the junction 78. The values of the resistances of the resistors 62B and 64B are chosen so that the product of the values of the resistors 62B and 68 does not equal the product of the values of the resistors 64B and 66. This arrangement provides for the immediate flow of current through the sensing batch 74 in the event the contact pair 96 and 100 and the contact pair 98 and 102 are each electrically connected without any resistance therebetween. Such an occurrence would take place, for example, if a key having no resistors thereon was inserted into the lockswitch 90.

The resistors 62B, 64B, 66 and 68, along with the sensing branch 74, the switch 60 and the actuating means 80, are shown in FIG. 1 within the starter housing 50. These components are thus hidden from view at a remote location to which quick access cannot be easily attained.

The arms of the bridge circuit 56 having the resistors 66 and 68 form one coded portion while the arms 62 and 64 form another coded portion. Within the arms 62 and 64 a pair of auxiliary coded portions are provided wherein the resistors 62A and 64A form one auxiliary coded portion and the resistors 62B and 64B form another auxiliary coded portion. These portions of the bridge circuit 56 are referred to as coded since the values of the resistances in these portions are preselected so that when the bridge circuit 56 is formed no current will flow through the sensing branch.

The bridge circuit 56 is formed when the key 82 is placed in the lockswitch 90. As stated above, all the resistors 62A–68 have the properly matched values of resistances so that no current will flow through the sensing branch 74 when the switch 54 is closed thereby enabling the anti-theft switch 60 to remain closed. Rotation of the key 82 in the lockswitch 90 closes the switch 54 to provide for the supply of electrical power through the bridge circuit 56 and the closed anti-theft switch 60 to the starter solenoid 24 which is thereby actuated to provide for the engagement of the ring gear 18 with the flywheel and the operation of the starter motor 14 to crank the engine.

If a key having no resistors on its stem is placed in the lockswitch 90, the starter motor 14 will be precluded from operating. If the contact pairs 96 and 100 and 98 and 102 are not bridged by the key, an open circuit exists. If the contacts 96–102 are bridged by the key, the actuating means 80 will provide for the immediate opening of the anti-theft switch 60 when the switch 54 is closed since the bridge circuit 56 is now unbalanced by virtue of the selected values of resistances of the resistors 62B, 64B, 66 and 68 which will provide for the flow of current through the sensing branch 74.

Assume that a thief recognizes the type of theft prevention system that he is dealing with and seeks to use a key having what he thinks are the proper resistors. If the resistors are not matched, and the key is inserted and rotated to the start position, current will flow through the sensing branch 74 since the bridge circuit 56 is unbalanced. This current flow provides for the operation of the actuating means 80 to immediately open the anti-theft switch 60. Therefore, when the starter switch 54 is closed, the flow of current from the battery 48 to the starter solenoid 24 will be interrupted at the anti-theft switch 60. It may be desirable to provide a time delay or a reset feature that cooperates with the actuating means 80 to maintain the anti-theft switch 60 in an open condition after the first theft attempt is made. Only after the owner returns and closes the switch 60 or only after a preset period of time would the switch 60 be closed to enable the activation of the starter motor 14. This would prevent the thief from experimenting with a number of keys having different combinations of resistors in an attempt to start the engine.

The theft prevention starter system 10 of the present invention provides theft preventive features that have been heretofore lacking. First, the contacts 96–102 are located within the lockswitch 90 so that a thief may not even know that the vehicle is equipped with the theft prevention system and will abandon the vehicle believing it to be inoperative. Even if he would have knowledge of the theft prevention starter system 10, he still faces the formidable task of providing on the first attempt, a key having the proper resistors mounted on its stem in order to operate the starter motor; this is a task in which the odds of succeeding are minimal.

As can be seen from the above description, the present invention provides an effective, low cost theft prevention starter system. The bridge circuit 56 with its coded portions, one coded portion being mounted on the key 82 and the other coded portion being remotely located within the starter housing 50, serves a dual function. First, the bridge circuit 56 will be formed only when the key 82 is inserted in the lockswitch 90. Second, the key 82 must be provided with the proper resistors 62A and 64A in order for the anti-theft switch 60 to be maintained in a closed position to enable the energization of the starter solenoid 24 to provide for the operation of the starter motor 14. The theft prevention sytem is unobtrusive and easy to install at a low cost.

What is claimed:

1. In a vehicle having a starter system comprising a starter motor, a power source, starter switch means operable when closed to connect said power source with said starter motor, and a housing enclosing said starter motor, the improvement comprising a theft-prevention system operable to inhibit the unauthorized actuation of said starter system, said theft prevention system including an auxiliary circuit connectable to said power source comprising at least a pair of separable associated coded portions, a freely transportable element carrying one coded portion, said other coded portion being disposed in said housing, theft-prevention switch means connected to said other coded portion and disposed in said starter housing, said theft-prevention switch means being operable to interrupt the transmission of power from said power source to said starter motor, means for connecting said coded portions, said theft-prevention switch means providing for the transmission of power from said power source to said starter motor only when said associated coded portions of said auxiliary circuit are connected, said theft-prevention switch means and said other coded portion of said auxiliary circuit being disposed in said housing to inhibit the unauthorized bypassing of said theft-prevention system.

2. The theft prevention system that is defined in claim 1, wherein said auxiliary circuit comprises a bridge circuit, said one coded portion on said element comprising a portion of said bridge circuit, said other coded portion in said starter housing having the remaining portions of said bridge circuit.

3. The theft prevention system that is defined in claim 1 further including ignition lock means operatively associated with said starter switch means to provide for the opening and closing of said starter switch means, and wherein said element comprises a key positionable in said lock means and operable to open and close said starter switch means, said means for connecting said coded portions having terminals disposed in said lock means to connect said coded portions when said key is positioned in said lock means, said theft prevention switch means providing for the transmission of power from said power source to said starter motor only when said associated coded portions are electrically connected.

* * * * *